(12) United States Patent
Koyanagi et al.

(10) Patent No.: US 8,010,512 B2
(45) Date of Patent: Aug. 30, 2011

(54) SYSTEM AND METHOD FOR MODEL-DRIVEN OBJECT STORE

(75) Inventors: Teruo Koyanagi, Yamato (JP); Hui Lei, Scarsdale, NY (US); Hiroyasu Ohsaki, Yokohama (JP); Liangzhao Zeng, Mohegan Lake, NY (US)

(73) Assignee: International Business Machines Corporation, Armonk, NY (US)

( * ) Notice: Subject to any disclaimer, the term of this patent is extended or adjusted under 35 U.S.C. 154(b) by 531 days.

(21) Appl. No.: 12/139,767

(22) Filed: Jun. 16, 2008

(65) Prior Publication Data

US 2009/0313298 A1    Dec. 17, 2009

(51) Int. Cl.
G06F 17/00    (2006.01)
(52) U.S. Cl. .................................. 707/694; 707/796
(58) Field of Classification Search .................. 707/694, 707/782
See application file for complete search history.

(56) References Cited

U.S. PATENT DOCUMENTS

| | | | |
|---|---|---|---|
| 6,260,035 B1 * | 7/2001 | Horvitz et al. | 706/60 |
| 6,681,383 B1 * | 1/2004 | Pastor et al. | 717/126 |
| 2006/0195460 A1 * | 8/2006 | Nori et al. | 707/100 |
| 2008/0167923 A1 * | 7/2008 | Chowdhary et al. | 705/7 |
| 2009/0300656 A1 * | 12/2009 | Bosworth et al. | 719/320 |

* cited by examiner

Primary Examiner — James Trujillo
Assistant Examiner — Linh Black
(74) Attorney, Agent, or Firm — Cahn & Samuels, LLP

(57) ABSTRACT

Disclosed is a system and method for model-driven datastore. The model-driven datastore includes an object persistence model editor for developing specific object persistence models based on an object persistence metamodel. The object persistence model consists of object model, object access pattern and user defined functions. The object model consists of a collection of object definition, said object definition supports at least one basic type or structure type of attributes. The object access pattern defines the access path that are used to retrieve the object instances, where the access path is consists of a collection of actions. The actions comprise at least one of the following a self action, parent action, or children action. User defined functions are declaratively defined and supports group operators. The model driven datastore further includes a model transformer for generating an object index based on object access patterns and executable code for supporting object access patterns and user defined functions and an object store manager for executing generated code that allows applications to create, update, retrieval or persist objects.

19 Claims, 5 Drawing Sheets

1. ObjectValues Table

| instanceID | attributeTypeID | attributeName | dimensionID | stringValue | doubleValue |
|---|---|---|---|---|---|
| 1 | 4 | 'order.lineItems.amount' | 1 | null | 1 |
| 1 | 2 | 'order.lineItems.name' | 1 | 'LED Monitor' | null |
| 1 | 4 | 'order.lineItems.amount' | 2 | null | 2 |
| 1 | 2 | 'order.lineItems.name' | 2 | 'mouse' | null |
| 1 | 4 | 'order.lineItems.amount' | 3 | null | 1 |
| 1 | 2 | 'order.lineItems.name' | 3 | 'printer' | null |

2. Dimension Table

| instanceID | dimensionID | dimensionOrder | sequenceID |
|---|---|---|---|
| 1 | 1 | 1 | 1 |
| 1 | 1 | 2 | 1 |
| 1 | 2 | 1 | 1 |
| 1 | 2 | 2 | 2 |
| 1 | 3 | 1 | 2 |
| 1 | 3 | 2 | 1 |

3. Types Table

| typeID | typeName |
|---|---|
| 1 | String |
| 2 | Double |
| 3 | Boolean |
| 4 | Integer |
| 5 | Timestamp |
| 6 | Numeric |

FIG. 5

SYSTEM AND METHOD FOR MODEL-DRIVEN OBJECT STORE

BACKGROUND OF THE INVENTION

Object store plays an important role in most data access intensive applications. It enables applications to create, read and update objects, and eventually save the objects into the persistence datastore. Conventional object store provides generic object-relational mapping services, which implements logic that able to handle all the generic cases. In fact, not all the generic cases are not required by the applications. While in order to support these generic case, extra code need to be deployed and executed. which incur performance penalties in the runtime. Example of such object store is Java Data Objects available at http://java.sun.com/products/jdo/. Also, the knowledge about access patterns of objects is ignored by the object store, which in fact can be used to expedite runtime access of objects. Further, user defined functions in the conventional object store require application developers' programming efforts to implement. An example of such object store is Enterprise JavaBeans Technology available at http://java.sun.com/products/ejb/. Hence, there is a need to address the respective limitations in conventional object store.

SUMMARY OF THE INVENTION

According to an embodiment of the present invention, disclosed is a system and method for model-driven datastore. The model-driven datastore includes an object persistence model editor for developing specific object persistence models based on an object persistence metamodel. The object persistence model consists of object model, object access pattern and user defined functions. The object model consists of a collection of object definition, said object definition supports at least one basic type or structure type of attributes. The object access pattern defines the access path that are used to retrieve the object instances, where the access path is consists of a collection of actions. The actions comprise at least one of the following a self action, parent action, or children action. User defined functions are declaratively defined and supports group operators. The model driven datastore further includes a model transformer for generating an object index based on object access patterns and executable code for supporting object access patterns and user defined functions and an object store manager for executing generated code that allows applications to create, update, retrieval or persist objects.

According to another embodiment of the present invention, disclosed is a method that defines at least one data persistence model for at least one application. The object persistence model consists of object model, object access pattern and user defined functions where the object model consists of a collection of object definitions. The object definition supports at least one basic type or structure type of attributes. The object access pattern defines the access path that are used to retrieve the object instances and the access path is consists of a collection of actions. The actions comprise at least one of the following: a self action, parent action, or children action. User defined functions are declaratively defined and supports group operators. The method of this embodiment further includes mapping object definition to a persistence datastore, where the persistence datastore is a unified relational data store that consists of four tables, namely ObjectInstances, ObjectValues, Dimensions and Types.

BRIEF DESCRIPTION OF THE DRAWINGS

The foregoing features will be better understood from the following detailed description of a preferred embodiment of the invention with reference to the drawings.

FIG. 5 is a collection of tables illustrating a snapshot of the persistence datastore according to an embodiment of the present invention.

DETAILED DESCRIPTION OF A PREFERRED EMBODIMENT OF THE INVENTION

Figure 1:
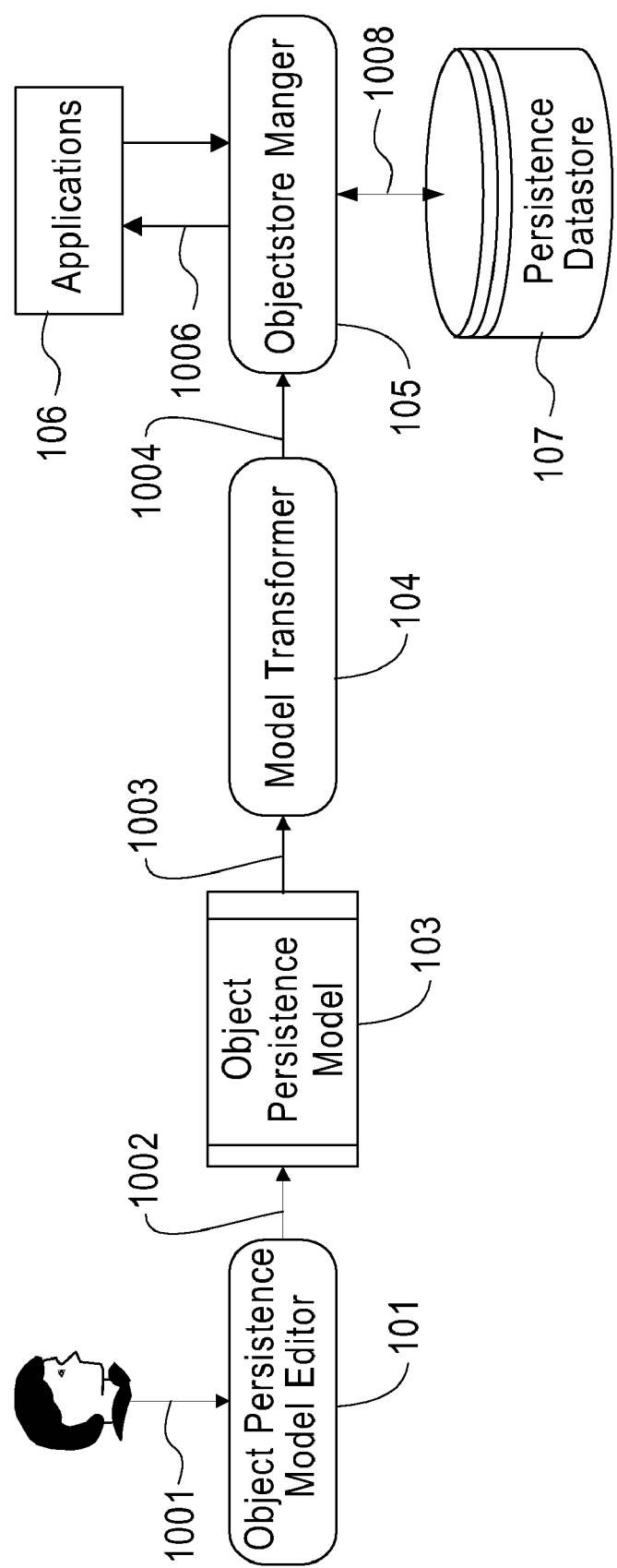
FIG. 1 is a flow diagram showing an embodiment of a system on which the invention is implemented.

The present invention describes a system and method for model-driven object store. Conventional object store provides generic object-relational mapping services that include logic to handle all the generic mapping cases which is not all required by the application that use the services. In order to support those generic cases, there is performance penalties incur in the runtime. In this disclosure, we propose a model-driven object store that aims for provide only necessary mapping services that required by the application. One approach according to an embodiment of the present invention is based upon the data persistence metamodel, wherein the object definition, access patterns and user defined functions can be declaratively defined as a data persistence model. Using this data persistence model knowledge, the mapping between object and relational table is pre-computed. These pre-computed object-relational mapping allows the object store to provide only the necessary object persistence services required by the application, not any extra overhead that support generic mapping is involved. Further, some cache components are also generated based on access patterns on these objects, in order to expedite runtime access of objects. Further, user defined functions are realized by generated codes and executed in the object store, without any extra programming efforts are required by the application developers. Therefore, the proposed model-driven object store features in small footprint and high performance.

One aspect of the present embodiment generally relates to data persistence service for applications. Using the invention, application developers can declaratively define object persistence model, by using a model editor. By series of transformation, code generation and deployment, the proposed object store equits all and only necessary object-relational mapping logic and user defined functions that enables applications to create, read and update the object in a persistence datastore efficiently.

Aspects of the present embodiment develop object store that not only provides efficient object persistence services, but also generates code to implement user defined functions.

It should be noted that generated code is executed in the object store, which reduce the amount of data transmit from the object store to applications.

Another aspect of the present embodiment proposes a model-driven object store. It not only provides efficient object persistence services, but also generates code to implement user defined functions and execute the user defined function in object store. Another aspect of the present embodiment proposes an object persistence metamodel that provides a language that allows application developers to specify object persistence models, by using a model editor. A model defines types of objects need to be persisted and associated access patterns, as well as user defined functions, in an application. Based on the object persistence model, the mapping between the object and relational tables are pre-computed and some cache components are generated to facilitate the runtime access. With these pre-computed mapping relationship and generated components, the proposed model-driven object store features in small footprint and high performance. Further, the metamodel allows application developer specify user defined function declaratively. It should be noted that application logic of user defined function is realized by generated code and then executed in the object store.

The present disclosure provides embodiments that are a novel model-driven approach to implement object store and aims for efficient and timely management of object instances.

(1) Object Persistence Metamodel

The proposed object persistence metamodel enables application developers to specify object definitions and their access patterns, as well as user defined functions. When defining object attributes, both primitive type (e.g., integer, string, etc.) and structure type (including nesting structure) can be used. The object access patterns define how object instances can be retrieved by their attribute values and read/write options on each attribute. It should be noted that such information can be used by proposed model-driven object store to generated customized executable code that facilitate efficient runtime object access. Further, the object persistence metamodel allows application developers declaratively define functions, which are implemented by generated code. This not only frees them from detail programming efforts on implementing functions in build time, but also greatly reduces the amount of data that transmits from object store to the application in runtime.

(2) Unified Persistence Datastore

An intuitive design choice for a persistence datastore is to save each type of the object instance as a record in a pre-defined table (one attribute for one column in table). In such an approach, the mapping between the object and datastore is simple. However, this requires creating new tables when there are changes in the object persistence model. Considering the dynamics of application, evolution of the object persistence may occur frequently. Therefore, the runtime datastore may need to maintain a large number of tables for different version of the object persistence model. In order to overcome this limitation, the disclosure provides a unified data schema that any object persistence models can map to. The approach requires more complicated mappings between the object and the datastore. However, these mappings can be computed at the buildtime, and will not incur any performance penalty at the runtime.

(3) Model-Driven Code Generation for Optimizing Cache

Based on the object persistence model, proposed object store generates cache components to facility efficient runtime access on object instances. The generated components aim for reducing I/O access in the runtime. Also, user defined functions are implemented by generated code. The code is customized generated and utilizing the cache in object store, which aims for reducing demands on both CPU cycle and I/O access. It should be noted that execution of functions is adaptive according to object access patterns and the usage of cache in the runtime.

Referring now to the drawings, and more particularly to FIG. 1, there is shown an embodiment of a system on which the invention may be implemented. At the heart of the system are the object persistence model editor (OPMD) 101, model transformer (MT) 104, object store manager (DSM) 105 and persistence datastore (PD). In a preferred embodiment of the invention, the object persistence model editor 101 allows users to define object persistence models 103 and deploy them to the model transformer 104. The model transformer 104 computes the mapping between objects and persistence datastores 107, generates cache components that facility runtime access of object instance, and generates executable code for user defined functions. The persistence datastore provides persistence storage for object instances. The object store manger 105 provides object persistence services for applications 106 and implements/executes user defined functions.

Object Persistence Metamodel

Object persistence metamodel provide a language that allows application developers to specify object persistence model. An object persistence model includes object definition; object access pattern and user defined functions. In the following, these three aspects are presented in detail.

1) Object Definition

Figure 2:
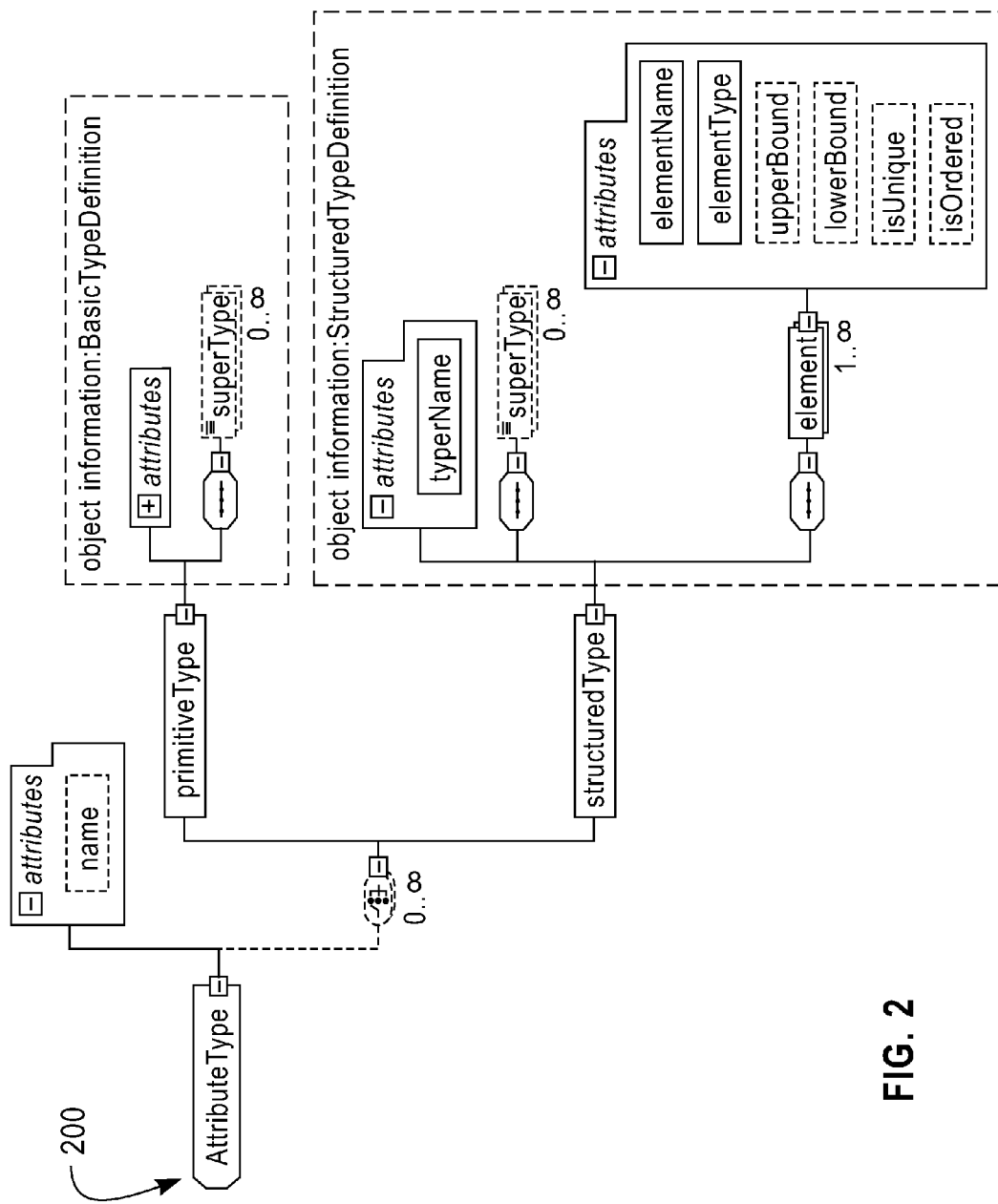
FIG. 2 is a diagram showing the attribute definition of an object type in object persistence metamodel according to an embodiment of the present invention.

Object definition specifies the object that need be persisted during the lifespan of the application. In the metamodel, the attributes 200 of an object can be either basic type or structure type as shown in FIG. 2.

2) Object Access Pattern

Object access pattern defines the methods that are used to retrieve the object instances. The syntax of access pattern expression is given as follows:

```
AccessPatternExpression :== ObjectType (LogicalExpression)
LogicalExpression :== ConditionalAndExpression
ConditionalAndExpression :== ComparisonExpression ( <AND>
ComparisonExpression )*
ComparisonExpression:== ObjectPathExpression <ComparisonOp>
Literal
ObjectPathExpression :== ObjectType ( Step )*
Step :== "." <AttributeName> | "." <AttributeName> ArrayStep
ArrayStep :== [<INTEGER_LITERAL > (,INTEGER_LITERAL)*]
Literal :== <INTEGER_LITERAL> | <REAL_LITERAL> |
<STRING_LITERAL> |
<BOOLEAN_LITERAL>
ComparisonOp :== "=" | ">=" | ">" | "<" | "<="
```

3) User Defined Function

The object persistence metamodel provides a language that allows application developers to specify user defined functions declaratively. The syntax of user defined functions is given as follows:

```
Expression ::== BinaryLogicalExpression | NumericalExpression
BinaryLogicalExpression ::== ConditionalOrExpression
ConditionalOrExpression ::== ConditionalAndExpression ( <OR>
ConditionalAndExpression )*
ConditionalAndExpression ::== ComparisonExpression ( <AND> ComparisonExpression )*
ComparisonExpression ::== NumericalExpression ( <ComparisonOp>
NumericalExpression )*
NumericalExpression ::== AdditiveExpression | GroupFunction
GroupFunction ::== GroupOperator (ObjectPathExpression, SelectionPredicate)
SelectionPredicate ::== (ObjectPathExpression, ConditionalAndExpression)
ConditionalAndExpression ::== ComparisonExpression ( <AND> ComparisonExpression )*
ComparisonExpression::== ObjectPathExpression <ComparisonOp> Literal|
AdditiveExpression ::== MultiplicativeExpression ( ( <ADD> | <MINUS> )
MultiplicativeExpression )*
MultiplicativeExpression ::== UnaryExpression ( ( <MULTIPLY> | <DIVIDE> | <MODULAR> )
UnaryExpression )*
UnaryExpression ::== <MINUS> PrimaryExpression | <NOT> PrimaryExpression
PrimaryExpression ::== Literal | "(" Expression ")" | ObjectPathExpression
ObjectPathExpression ::== ObjectType ( Step )*
Step ::== "." <AttributeName> | "." <AttributeName> ArrayStep
ArrayStep ::== [<INTEGER_LITERAL > (,INTEGER_LITERAL)*]
Literal ::== <INTEGER_LITERAL> | <REAL_LITERAL> | <STRING_LITERAL> |
<BOOLEAN_LITERAL>
ComparisonOp ::== "=" | ">=" | ">" | "<" | "<="
GroupOperator ::== "AVG" | "COUNT" | "MAX" | "MIN" | "SUM"
```

Object Store Manager

Figure 3:
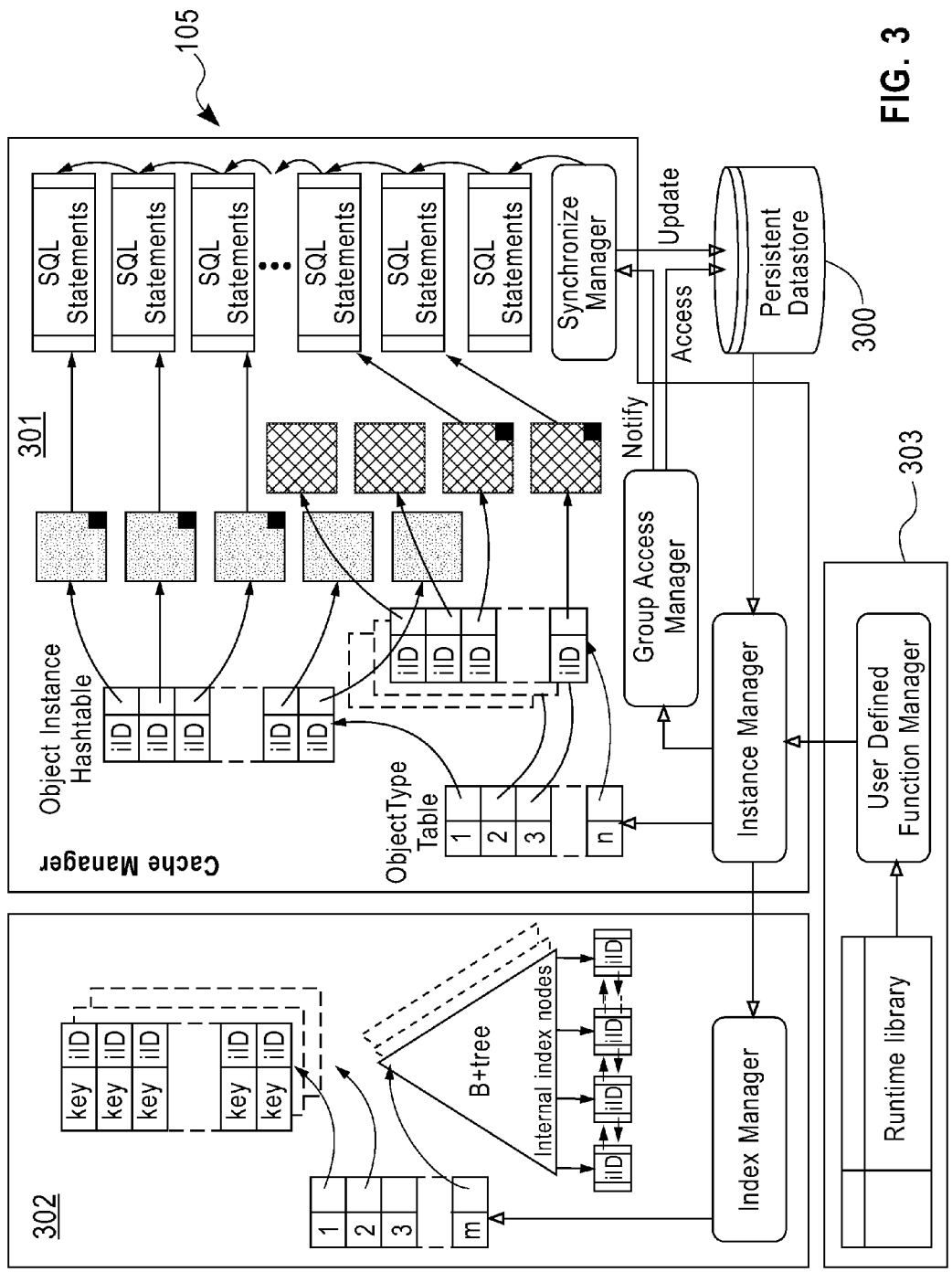
FIG. 3 is a block diagram showing the overall flow of an object store manager for providing data persistence services and executing user defined functions according to an embodiment of the present invention.

Referring to FIG. 3, the object store manager 105 consists of a persistent datastore 300 (relational tables), cache manager 301 (consists of an instance manager, a group access manager, and a synchronize manager), an index manager 302 and a user defined function manager (303). In the following, embodiment of the design of these components will be discussed.

(1) Persistence Datastore

Figure 4:
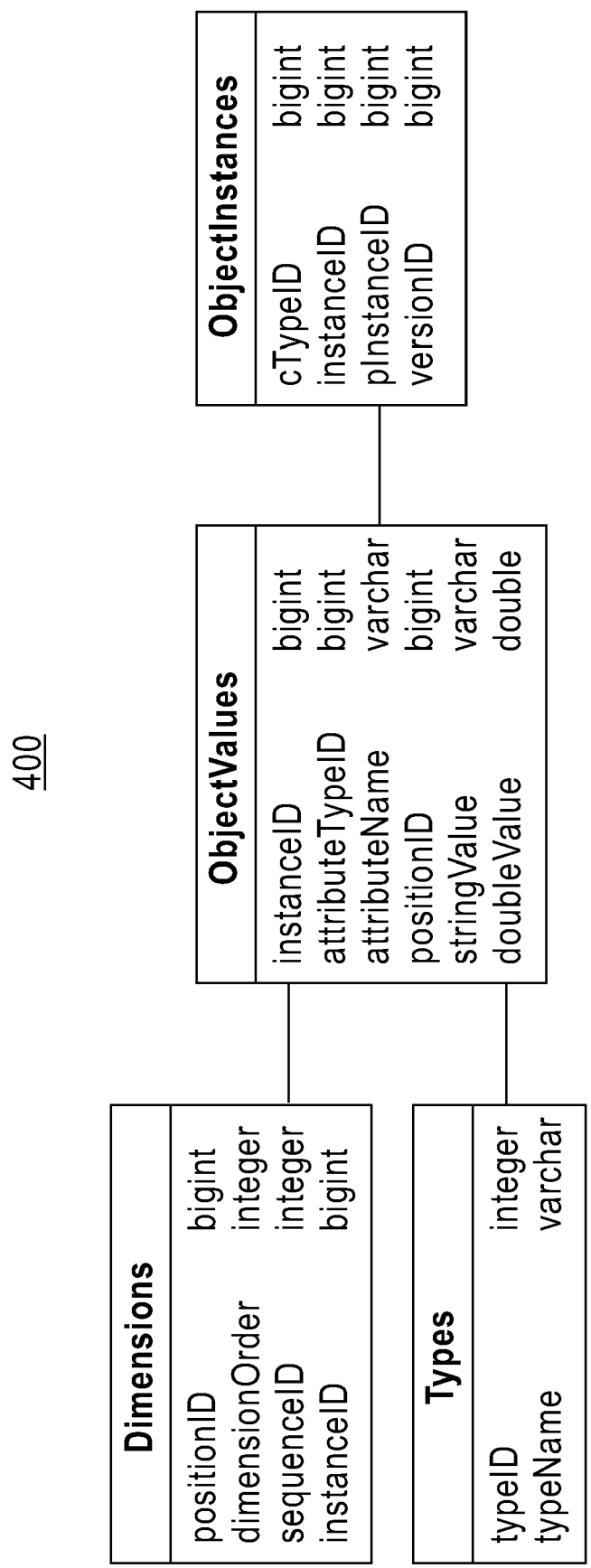
FIG. 4 is a diagram showing the database schema for the persistence datastore according to an embodiment of the present invention.

An intuitive design choice for a persistence datastore is to save all an object instance as a record in a predefined table. In such an approach, the mapping between the instances and the datastore is simple. However, this requires creating new tables when there are changes of object definition in a newer object persistence model. Considering the dynamicity, evolution of the data persistence model may occur frequently. Therefore, the datastore may need to maintain a large number of tables for different version of the observation model. In order to overcome this limitation, we designed a unified data schema that any object persistence models can map to. Thus another approach requires more complicated mappings between the instance objects and the datastore. However, these mappings can be computed at the buildtime, and will not incur any performance penalty at the runtime. Further described is the data schema for the datastore first, and then present the details on the mapping relationships between the instance objects and datastore. A present embodiment, separates the organization 400 of object types from the data of the object instances (see FIG. 4), wherein one table ObjectInstances (O) is used to store the object instances, while another table ObjectValues (V) is used to store the attributes of object instances. It should be noted that the content of the object instances are stored vertically in table Objectvalues. In table Objectvalues, each elementary element in object instances has a record in the table and objectInstanceID is unique for each object instance. Using objectInstanceID, the records in the table can be correlated to individual object instances. Table Dimensions (D) is used to store the dimension information when there exists array type of data elements in object instances. By specifying dimensionOrder and sequenceID, the datastore can store any dimension array of data in an object instance. Further, the table Types (T) gives type information. Given such an persistence data model, the mapping between the object and relational table can be precomputed. Assuming a full description of an attribute (which is primitive type t, and typeID is tID) can be denoted as $\xi_i a_1[d_1^1, d_2^1, \ldots, d_k^1].a_2[d_1^2, d_2^2, \ldots, d_1^2] \ldots a_m[d_1^m, d_2^m, \ldots, d_n^m]$, the mapping between object operations and related SQL statements is given as following:

New create object.

INSERT INTO ObjectValues(instanceID,attributeTypeID,attributeName,positionID, stringValue,doubleValue)
  VALUES (newInstanceID, tID, '$\xi_i a_1[d_1^1, d_2^1, \ldots, d_k^1].a_2[d_1^2, d_2^2, \ldots, d_1^2] \ldots a_m[d_1^m, d_2^m, \ldots, d_n^m]$', newPositionID, null, $\xi_i a_1[d_1^1, d_2^1, \ldots, d_k^1].a_2[d_1^2, d_2^2, \ldots, d_1^2] \ldots a_m[d_1^m, d_2^m, \ldots, d_n^m]$])

INSERT INTO Dimensions (positionID, dimensionOrder, sequenceID) VALUES (newPositionID, 1, $d_1^1$) (newPositionID, 2, $d_2^1$), ... (newPositionID, k+1+ ... +n, $d_n^m$) where newInstanceID is iID for new object instance, newPositionID is new ID for the position and attribute is double type.

Update attribute value.

UPDATE ObjectValues
SET doubleValue=$\xi_i a_1[d_1^1, d_2^1, \ldots, d_k^1].a_2[d_1^2, d_2^2, \ldots, d_1^2] \ldots a_m[d_1^m, d_2^m, \ldots, d_n^m]$
WHERE instanceID=instanceID and attributeName='$\xi_i a_1[d_1^1, d_2^1, \ldots, d_k^1].a_2[d_1^2, d_2^2, \ldots, d_1^2] \ldots a_m[d_1^m, d_2^m, \ldots, d_n^m]$'

Delete an existing object
DELETE FROM ObjectValue
WHERE instanceID=instanceID;
DELETE FROM Dimensions
WHERE instanceID=instanceID;

Assuming a multiple value attribute Order contains the orders for customers, where an order consists of an array 500 of attribute lineItem (see FIG. 5). The attribute itself is a structure that has two fields: price and itemName. In the persistence datastore, such an attribute can be persisted as shown in table 1. In this example, in the third row of table Values, dimensionID is 2, where in table Dimensions, two entries' dimensionID is 2: the first one's dimensionOrder is 1 and sequenceID is 2 and second one's dimensionOrder is 2 and sequenceID is 1. This indicates that position of third row in table Values is: 1 in first dimension, and 2 in the second dimension. The first dimension represents the order sequence and the second dimension represents sequence of the lineItem, therefore, the row represents the attribute in first order and second lineItem.

Once again referring to FIG. 3, the cache manager 301 and the index manager 302 are now described.

(2) Cache Manager

The cache design, the cache manager 301 consists of three components, namely instance manager, synchronize manager and group access manager. The instance manger implements two types of interfaces: (i) getObjectByInstanceID(Double iID), accessing object instances by object instance id (iID) and, (ii) getter/setter for each field in the object instance. The instance manger possesses a object type table that is generated from the object persistence model, an entry for each object type. Each entry associate with a hash table that caches the object instances of the particular object type. In order to implement the interface getObjectByInstanceID(Double iID), the hash table uses the iID as the "key", and object instance as the "value". When implement setter, the "dirty" object instance links to one entry in the SQL statements queue that are managed by the synchronize manager. These SQL statements inserted by setter method and are used to update the Values tables to persist the changes of object instances in the cache. The SQL statements are updated when any fields' setter in instance is invoked. For example, when the setter for an attribute is invoked, not only the attribute value is updated in cache, but also the SQL statements that are used to update table Values are generated and saved in the queue entry. It should be noted synchronize manager executes all the SQL statements in queue entries either periodically (i.e., when timeout happens) or when the queue is full.

Hash table based caches provide very good performance when the object instance is individually accessed by iID. However, in case of a collection of object instances are accessed by group operators (e.g., avg, count, etc.), these hash table based caches are not appropriated when the memory is not big enough to cache all the object instances. In order to efficiently support group operator, a group access manager is proposed. Before the deployment time, it analyzes the group operator's access patterns in the expressions, in order to adopt an optimal approach to access object instances in the runtime. For example, by analyzing the access patterns, it can determinate what to cache and how to cache before the runtime. In an object persistence model, the possible group access patterns for an operand and related strategy for executing operators is given as follows:

(i) Group Read Only. In this case, if the cache contains all the object instances in the persistent datastore, the group operators are executed based upon the objects in caches. There are two approaches to execute the group operators: (1) If the group operator does not associated selection predicates or the predicate's condition is static (for example, o.a1>100), the group access manager can pre-compute the value and re-compute the value when a new operand value is initiated or updated; (2) If the operator associates with dynamic predicate, then the computation is performed only when the expression or predicate are executed. If the cache only contains subset of object instances in persistence datastore, the group access manager need to request the synchronization manager executes all the SQL statements in the queue and then directly access the persistence datastore.

(ii) Group Write Only. In this case, it is not necessary to cache the operand value in the memory. When the execution of operator is triggered, the group access manager customizes SQL statements based on pregenerated SQL templates and notifies the synchronization manager to add a new SQL entry into the queue.

(iii) Group Read/Write. In this case, if the cache contains all the object instances in the persistent datastore, the group operators are executed based upon the objects in caches. In case of the cache only contains subset of object instances in persistence datastore, the group access manager needs to request the synchronization manager to execute all the SQL statements in the queue and then directly access the persistence datastore.

3) Index Manager

In the runtime, content based object instance retrieval may be required by applications. These types of retrieval may depend on value of multiple attributes in object instances, and both equality and range query can be adopted. In order to accelerate these queries and avoid the full table scan, the index manager 302 maintains a collection of indexes, based on equality and range queries in user defined access patterns. In the current embodiment, the index manager creates two types of indexes, namely hash table index and B+ tree index. Hash table indexes are created for equality queries, while B+ tree indexes are created for range queries. For example, a hash table index is created for the access pattern Item (item.itemID=?), wherein itemID is used as the key and maps to object Item's instance ID.

User Defined Function Manager

The user defined function manager possesses a runtime library that contains executable code that is generated based on specification of user defined functions in object persistence model. In the runtime, when there is an execution request of user defined function from an application, the user defined function manager communicate with object instance manager to access the object instances. It should be noted, based on the content of cache, it can either use the object instances in cache to evaluate the user defined function, or execute SQL statements in persistence datastore Customized Code Generation When generating code for evaluation expressions, two cases are considered based on type of operators: (i) none-group operators. For the expression only contains none-group operator, Java code is generated to manipulate the objects in the cache; (ii) group operators. For the expressions contains group operators, both Java code that manipulate objects in the cache and execute SQL code in the persistence datastore are generated. In this section, we use following expression as an example to illustrate how the code is generated for evaluating expressions.

$$c, \zeta = \chi(c_1, \zeta_1, c_2, \zeta_2, \ldots, c_n, \zeta_n) \quad (1)$$

Java Code Generation

Generating Java code for expression evaluation consists of three steps: (1) generating code for retrieval the value of each operand; (2) generating code for executing operator $\chi$; (3) generating code for assigning the value to object $\zeta$. In the rest of section, we present each step of in detail.

In first step, the model compiler generates code to retrieve the operand's value in the cache. By specifying attributes of the attribute and object navigation path, the attribute operand $\zeta_i$ in expression (1) can be further refined as:

$$o_i</\mu_1/\mu_1/, \ldots, \ldots, /\mu_k>\cdot\zeta_i[d_1, d_2, \ldots, d_1] \quad (2)$$

Where $</\mu_1/\mu_1/, \ldots, \ldots, /\mu_k>$ is the access path of object $o_i$ and $\mu_i$ is a path-step; and $[d_1, d_2, \ldots, d_1]$ is dimension of object if $o_i$ is a multiple dimension object. Assume that the object type of $o_i$ is T, There are tree type of steps in access paths, namely self path-step (represent as [iID], or [$k_1$, $k_2$, ..., $k_n$], where iID is object id of $o_i$, $k_1, k_2, \ldots, k_n$ is the key to identify the object instance $o_i$), parent path-step (represent as [...]) and child path-step (represent as [$T_c$, iID], [$T_c$, $k_1, k_2, \ldots, k_n$]), where $T_c$ is the child type, iID is object id for $o_i$'s child, $k_i$ is the key to identify the object instance of $o_i$'s child.

The code generation for accessing operand consists of two phases: (i) generating code to retrieve the object instance object; (ii) generating code to retrieve the content of the attribute. We discuss how to generate code to retrieve the object instance that the attribute $z_i$ belongs to first. Assuming is not a group operator; the code to retrieve the object instance is generated as shown in Table 1. It should be noted that in child path-step, the $k_i$ can not be null and should not contains any range queries as the target is one object instance.

TABLE 1

Code Generation for Non-group Operators

| Path-step Type | Generated Code |
| --- | --- |
| Self Path-step [iID] | ObjectInstanceC objectInstanceC = CacheManager.getObjectCache(T).getObjectInstanceByID (iID); |
| Self Path-step [$k_1, k_2, \ldots, k_n$] | ObjectInstanceC objectInstanceC = CacheManager.getObjectCache(T).getObjectInstanceByKey (k1, k2, ..., kn); |
| Parent Path-step [..] | CacheManager.getObjectCache(T).getObjectInstanceByID (iID); |
| Child Path-step [$T_c, k_1, k_2, \ldots, k_n$] | ObjectInstanceCi objectInstanceCi = objectInstanceC.getChildObjectInstanceByKey(Tc, k1, k2, ..., kn); |
| Child Path-step [$T_c$, iID] | ObjectInstanceCi objectInstanceCi = objectInstanceC.getChildObjectInstanceByID(Tc, iID); |

It should be noted that the above method getObjectInstanceByKey( ) is implemented based on the hash based index that created by index manager. By applying above two cases on steps in the object path, we can get the target object instance objectInstanceCn. For retrieving the attribute value, as we generate the getter and setter methods for each attribute, the getter objectInstanceCn.getAttributei( ) can be used.

In case $\chi$ is a group operator, two types of code need to be generated: the one accesses objects in caches to execute the operator, and the one that executed by the persistent datastore, We discuss the generation of code that accesses the cache first (see Table 2). As it is a group operator, the target object instances can be multiple. For the parent path-step, the code generation is the same as non-group operators. However, in case of the child path-step, instead of single object instance, an array of object instances can be are retrieved. Here, we differentiate two cases: either by key value or by object instance ID (iID). Further, once there is a child path-step, the retrieval path-step afterwards needs to be done in the loop. At last path-step, all the operand attributes are added into a collection as the operand for group operators.

TABLE 2

Code Generation for Group Operators

| Path-step Type | Generated Code |
| --- | --- |
| Child Path-step, [$T_c$, null] | ObjectInstanceCi[ ] objectInstanceCis = objectInstanceC.getChildObjectInstanceByType(Tc); |
| Child Path-step, [$T_c, k_1, k_2, \ldots, k_n$] | ObjectInstanceCi[ ] objectInstanceCis = objectInstanceC.getChildObjectInstanceByKey(Tc, k1, k2, ..., kn); |
| Path-step after Child Path-step | for (ObjectInstanceCi objectInstanceCi: objectInstanceCis) {...} |

SQL Code Generation

The code that bypasses the cache and executed in the persistent datastore is also generated in two phases: (i) generating queries to retrieve the object instance; (ii) generating queries to retrieve the content of the attribute. We discuss how to generate queries to retrieve the object instance that the attribute $\zeta_i$ belongs to first. In order to self-join the table ObjectInstances, we rename it as $C_i$ according to each path-step in object navigation path:

$$\rho(C_i,C), i \in [1 \ldots k] \quad (3)$$

Then the query for retrieval target object instance is:

$$\rho(p, \pi_{C_k.instanceID}(C_1 \bowtie_{q_1} C_2 \bowtie_{q_2}, \ldots, \sqsubset C_k)) \quad (4)$$

This query joins all the objects in the object path and then projects the destination object instances' instanceID. In the query, $q_j(j \in [1 \ldots k-1])$ is the equijoin predicate for $C_j$ and $C_{j+1}$. The generation of equijoin predicate $q_j$ is based on the direction of path-step $m_i$. In case of child-parent path-step, predicate $q_j$ is $C_j.pInstanceID=C_{j+1}.instanceID$, indicating $C_j$'s parent object is $C_{j+1}$. In case of parent-child path-step, predicate $q_j$ is $C_j.instanceID=C_{j+1}.pInstanceID$, indicating $C_j$ is parent object of $C_{j+1}$. Further, in second case, if the predicate in the path-step □ is not null, then query that search for object instance that can satisfy the predicate p is:

$$\rho(V_{j+1}, \pi_{instanceID}(\sigma_{V.elementName=k.name\text{-}p'}(V))) \quad (5)$$

This query selects tuples that can satisfy the predicates from table ObjectValues and projects the instanceID. In the query, p' is transformed from p by replacing the attribute $\zeta_k$ with V.stringValue (resp. V.doubleValue) in predicate p, if the key attribute's data type is string (resp. double). In this case, the query 5 needs to be refined as:

$$\rho(p, \pi_{c_k.instanceID}(C_1 \bowtie_{q_1} C_2 \bowtie_{q_2}, \ldots, \\ C_j \bowtie_{C_{j\text{-}1}.instanceID=V_{j+1}.instanceID} V_{j+1}, \ldots, \\ \bowtie_{q_2} C_k)) \quad (6)$$

Based on query (5), this query also joins the table Values to select the right child object instances. Now we know which object instance that attribute $\zeta_i$ belongs to. In the following, we illustrate how to retrieve its attribute value. If the $\zeta_i$'s data type is string, then the query generated for retrieval $\zeta_i$ is:

$$\rho(V_i, \pi_{stringValue,dimensionID}(\sigma_{V.itemName=a_i} \\ (V \bowtie_{instanceID} P))) \quad (7)$$

This query joins the table Values with object instances that are specified by the object path. As dimension expression of $o_i$ is $[d_1, d_2, \ldots, d_l]$, the extra queries about the dimension is generated as:

$$\rho(D_{j,k}, (\sigma_{D.dimension=k\text{-}D.sequenceID=d_k} D))), k \in [i \ldots j] \quad (8)$$

It should be noted that each above query is according to a dimension of the attribute, which selects the tuple in table dimensions that represent the dimension is specified by the operand expression. By equijoining $D_{i,j}$ on dimensionID to select dimension information on same attribute, we have:—

$$\rho(V_i', \pi_{stringValue}(V_i \bowtie_{dimensionID} D_{i,k})) \quad (9)$$

where $V_i'$ represents the value of attribute operand expression $\zeta_i$. The group operators are supported by SQL. Therefore, by applying the group operators in select clause, the group operator can be executed in persistent datastore, which reduce the I/O between the runtime engine and persistent datastore.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A system for a model-driven datastore, said system comprising:
    an object persistence model editor for developing specific object persistence models based on an object persistence metamodel, said object persistence model consists of an object model, object access patterns, user defined functions, and a collection of object definitions,
        said object definitions support basic type attributes and structure type attributes,
        said object access patterns define an access path that is used to retrieve object instances, said access path consists of a collection of path-steps, said path-steps comprise a self path-step, a parent path-step, and a children path-step,
        said user defined functions are declaratively defined, said user defined functions support group operators,
    a model transformer for generating executable code for supporting said object access patterns and said user defined functions; and
    an object store manager for executing generated code that allows applications to create, update, retrieve and persist objects, said object store manager comprises a cache manager and a persistent datastore, said cache manager comprises a synchronize manager, said synchronize manager manages a SQL statement queue, said SQL statement queue contains SQL statements used to synchronize object states in cache and data in said persistent datastore; wherein said object store manager further comprises an index manager and a user defined function manager, and said cache manager comprises a group access manager and an instance manager;
    wherein said index manager creates an index for objects in said cache based on said object access patterns and maintains said index for objects in said cache by executing said executable code generated by said model transformer.

2. The system of claim 1, wherein said model transformer computes mapping object definition to said datastore, generates executable code to create and maintain said index based on said object access patterns, and generates executable code to realize said user defined functions.

3. The system of claim 1, wherein said object persistence model editor provides an interface to specify an object type, said object access patterns, and said user defined functions.

4. The system of claim 1, wherein said object store manager further has the capability to execute code generated by said model transformer to realize said user defined functions.

5. The system of claim 1, wherein said object persistence metamodel provides a language for specifying an object type, said object access patterns, and said user defined functions.

6. The system of claim 1, wherein said group access manager determines whether the group operators should be executed in said cache or in said persistent datastore.

7. The system of claim 1, wherein said synchronize manager manages execution of the SQL statements in said SQL statement queue when either timeout has occurred or said SQL statement queue is full.

8. The system of claim 1, wherein said user defined function manager executes code generated by said model transformer based on specifications of said user defined functions.

9. The system of claim 1, wherein said persistent datastore manages a unified relational data store that consists of four tables, namely ObjectInstances, ObjectValues, Dimensions and Types.

10. A method for a model-driven object store, said method comprising:
defining at least one data persistence model for at least one application,
said object persistence model consists of an object model, object access patterns, and user defined functions, said object model consists of a collection of object definitions,
said object definitions support basic type attributes and structure type attributes,
said object access pattern defines an access path that is used to retrieve object instances,
said access path consists of a collection of path-steps, said path-steps comprise a self path-step, a parent path-step, and a children path-step,
said user defined functions are declaratively defined, said user defined functions support group operators;
mapping said object definitions to a persistence datastore, said persistence datastore is a unified relational data store that consists of four tables, namely Object Instances, Object Values, Dimensions and Types;
generating runtime code for creating, retrieving, updating and saving objects into said persistence datastore, creating and maintaining index for locating objects in a cache, and accessing objects in said cache or said persistence datastore in runtime;
generating runtime code to realize said user defined functions;
managing a SQL statement queue for storing SQL statements used to synchronize object states in said cache with data in said persistence datastore;
executing the SQL statements in said SQL statement queue to synchronize object state changes and data in said persistence datastore;
deploying said generated runtime code for creating and saving objects into said persistence datastore, accessing said objects in said persistence datastore in runtime and executing at least one of said user defined functions; and
executing at least one of said user defined functions in an object store by choosing to minimized the amount of data transmitted from said object store to said at least one application; and when a setter interface for at least one of said basic type attributes and said structure type attributes are invoked:
updating a value of at least one of said basic type attributes and said structure type attributes in said cache;
generating the SQL statements;
saving the SQL statements in said cache; and
updating values in said tables using the SQL statements.

11. The method of claim 10, further comprising generating SQL code that is executable in said persistence datastore.

12. The method of claim 10, wherein said executing at least one of said user defined functions, further comprises determining whether at least one group operator should be executed in said cache in said object store.

13. The method of claim 10, further comprising determining whether at least one group operator should be executed in at least one persistent datastore.

14. The method of claim 10, further comprising initiating the execution of the SQL statements in said SQL statement queue when timeout has occurred.

15. The method of claim 10, further comprising initiating the execution of the SQL statements in said SQL statement queue when the queue is full.

16. The system of claim 2, wherein said model transformer pre-computes said mapping before run-time based on said object persistence metamodel, said object definitions, said object access patterns, and said user defined functions.

17. The method of claim 10, wherein said mapping of said object definitions is pre-computed before run-time, said mapping being based on said object definitions, said object access patterns, said user defined functions, and an object persistence metamodel of said object persistence model.

18. The method of claim 10, further comprising, when execution of said group operators is triggered:
customizing the SQL statements based on pregenerated SQL templates; and
notifying a synchronization manager to add a new SQL entry into said SQL statement queue.

19. A method for a model-driven object store, said method comprising:
defining at least one data persistence model for at least one application, said object persistence model comprises an object model, object access patterns, and user defined functions, said object model comprising a collection of object definitions,
said object definitions support basic type attributes and structure type attributes,
said object access pattern defines an access path that is used to retrieve object instances,
said user defined functions are declaratively defined, said user defined functions support group operators;
mapping said object definitions to a persistence datastore, said mapping being pre-computed before run-time based on said object definitions, said object access patterns, said user defined functions, and an object persistence metamodel of said object persistence model,
said persistence datastore is a unified relational data store including an object instances table, an object values table, a dimensions table, and a types table;
generating runtime code for:
creating, retrieving, updating and saving objects into said persistence datastore,
creating and maintaining index for locating objects in a cache, and
accessing objects in at least one of said cache and said persistence datastore at runtime;
generating runtime code to realize said user defined functions;
when a setter interface for at least one of said basic type attributes and said structure type attributes are invoked:
updating a value of at least one of said basic type attributes and said structure type attributes in said cache,
generating SQL statements, saving the SQL statements in said cache, and updating values in said tables using the SQL statements;

managing an SQL statement queue for storing the SQL statements used to synchronize object states in said cache with data in said persistence datastore; and executing the SQL statements in said SQL statement queue to synchronize object state changes and data in said persistence datastore.

* * * * *